(12) United States Patent
Inoue et al.

(10) Patent No.: US 8,754,353 B2
(45) Date of Patent: Jun. 17, 2014

(54) SOLAR CELL SYSTEM FOR OUTPUTTING AN AUDIO SIGNAL

(75) Inventors: Yoshiaki Inoue, Aichi (JP); Jusuke Shimura, Kanagawa (JP)

(73) Assignee: Sony Corporation, Tokyo (JP)

(*) Notice: Subject to any disclaimer, the term of this patent is extended or adjusted under 35 U.S.C. 154(b) by 424 days.

(21) Appl. No.: 13/160,606

(22) Filed: Jun. 15, 2011

(65) Prior Publication Data
US 2011/0315857 A1    Dec. 29, 2011

(30) Foreign Application Priority Data

Jun. 25, 2010 (JP) .................. 2010-144387

(51) Int. Cl.
G01C 21/02 (2006.01)
G01C 21/24 (2006.01)
G01J 1/20 (2006.01)

(52) U.S. Cl.
USPC .................. 250/203.4; 250/208.2; 250/203.5

(58) Field of Classification Search
CPC ... H01L 31/058; H01L 25/045; H01L 31/042; H01L 31/05; H01L 41/00; H01L 51/00; H02S 10/00
USPC ............ 250/208.1, 208.2, 203.4, 203.5; 257/E25.009
See application file for complete search history.

(56) References Cited

U.S. PATENT DOCUMENTS

| | | | | |
|---|---|---|---|---|
| 4,322,630 A | * | 3/1982 | Mezera et al. | 290/40 C |
| 2008/0048099 A1 | * | 2/2008 | Nagai et al. | 250/208.5 |

* cited by examiner

*Primary Examiner* — Francis M Legasse, Jr.
(74) *Attorney, Agent, or Firm* — Sony Corporation of America

(57) ABSTRACT

Disclosed herein is a solar cell system including: a plurality of power generation panels that differ in the range of wavelengths of light they absorb from each other and convert light into power; a voltage detection section adapted to detect the voltage of power generated by each of the plurality of power generation panels; a reproduction section adapted to compare the voltages of the plurality of power generation panels detected by the voltage detection section so as to reproduce an audio or music signal appropriate to the comparison result; and an output section adapted to output audio or music reproduced by the reproduction section.

5 Claims, 3 Drawing Sheets

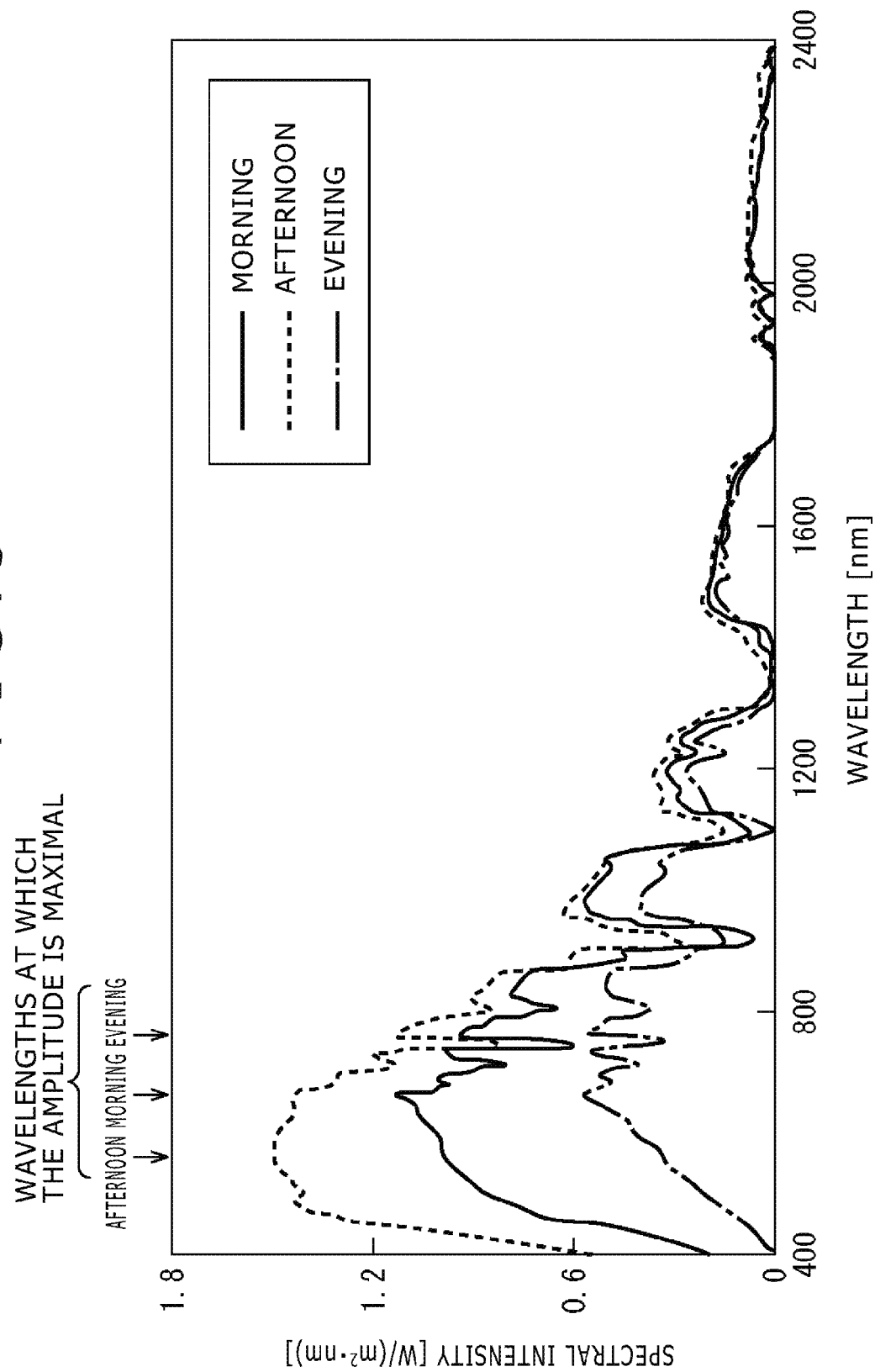

SOLAR CELL SYSTEM FOR OUTPUTTING AN AUDIO SIGNAL

BACKGROUND

The present disclosure relates to a solar cell system, and more particularly, to a solar cell system capable of outputting audio or music appropriate to environmental light with a simple configuration.

Solar cells or photoelectric conversion elements adapted to convert sunlight into electric energy use sunlight as a source of energy, making their impact on the global environment extremely small and raising expectations for more widespread use. Crystalline silicon-based solar cells using monocrystalline or polycrystalline silicon and amorphous silicon-based solar cells have been primarily used to date.

Recent years have seen progress in the commercialization of dye sensitized solar cells using organic dyes. Dye sensitized solar cells can be manufactured at lower cost and with lower energy than silicon-based solar cells. In addition, dye sensitized solar cells use a plastic sheet, making them flexible. Moreover, selection of a dye allows for these solar cells to have a variety of colors. Dye sensitized solar cells differ in the range of wavelengths of light they absorb depending on the organic dye used.

For example, the present applicant has proposed an apparatus operable to perform a process according to the color of environmental light or the type of illumination by taking advantage of the above characteristics of a dye sensitized solar cell and without using any dedicated sensor (refer, for example, to Japanese Patent Laid-Open No. 2008-20253).

SUMMARY

Efforts are in progress to commercialize dye sensitized solar cells as described above, and hopes are pinned on various examples of application taking advantage of the characteristics of these solar cells. For example, an apparatus is sought after which is capable of outputting audio or music appropriate to environmental light with a simple configuration.

The present disclosure has been made in light of the foregoing, and it is desirable to be able to output audio or music appropriate to environmental light with a simple configuration.

A solar cell system according to a mode of the present disclosure includes a plurality of power generation panels, a voltage detection section, a reproduction section and an output section. The plurality of power generation panels differ in the range of wavelengths of light they absorb from each other and convert light into power. The voltage detection section detects the voltage of power generated by each of the plurality of power generation panels. The reproduction section compares the voltages of the plurality of power generation panels detected by the voltage detection section, reproducing an audio or music signal appropriate to the comparison result. The output section outputs the audio or music reproduced by the reproduction section.

In the mode of the present disclosure, the voltage of power generated by each of the plurality of power generation panels is detected. The plurality of power generation panels differ in the range of wavelengths of light they absorb and convert light into power. The detected voltages of the plurality of power generation panels are compared. The audio or music signal appropriate to the comparison result is reproduced, thus outputting audio or music.

In the mode of the present disclosure, audio or music appropriate to environmental light can be output with a simple configuration.

BRIEF DESCRIPTION OF THE DRAWINGS

FIG. 3 is a diagram illustrating the sunlight spectra.

DETAILED DESCRIPTION OF THE PREFERRED EMBODIMENT

A detailed description will be given below of a specific embodiment to which the present disclosure is applied with reference to the accompanying drawings.

Figure 1A:
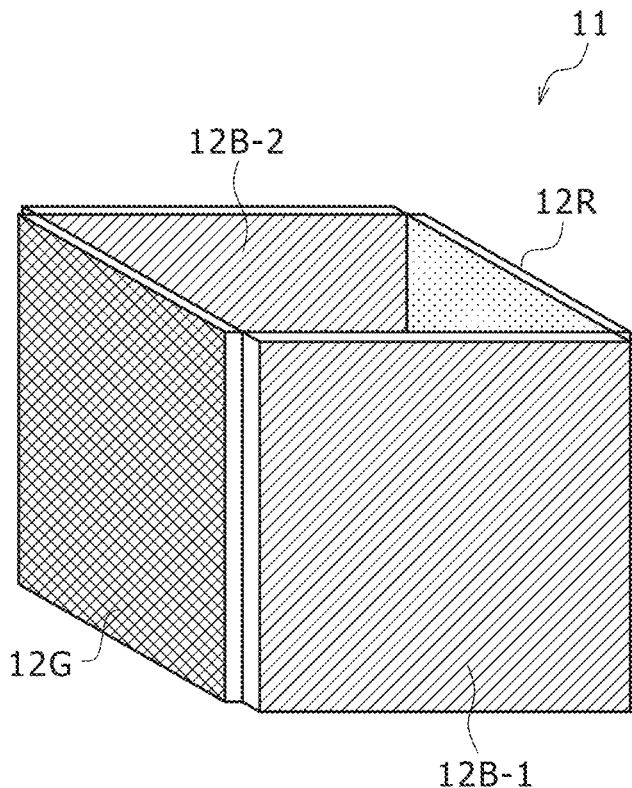
FIGS. 1A and 1B are diagrams illustrating a configuration example of an embodiment of a solar cell system to which the present disclosure is applied.
Figure 1B:
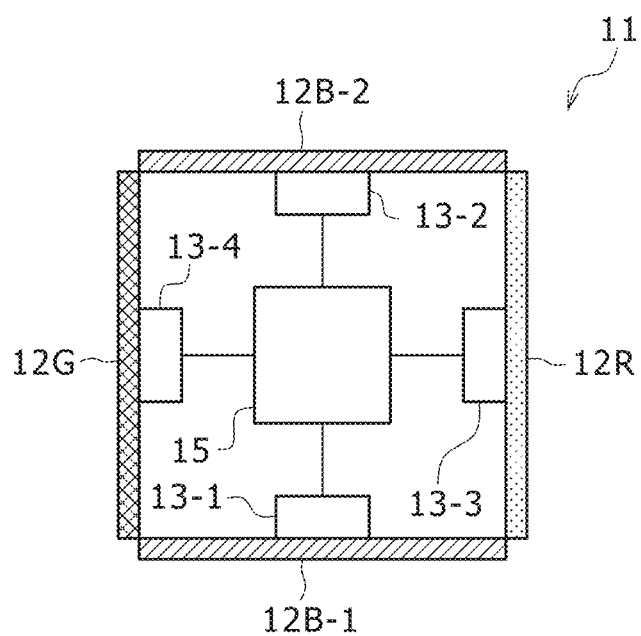

FIGS. 1A and 1B are diagrams illustrating a configuration example of an embodiment of a solar cell system to which the present disclosure is applied. FIG. 1A illustrates a perspective view of a solar cell system 11, and FIG. 1B illustrates a plan view of the same system 11.

As illustrated in FIGS. 1, the solar cell system 11 includes four power generation panels 12R, 12G, 12B-1 and 12B-2, four piezoelectric elements 13-1 to 13-4 and a control unit 15.

The power generation panels 12R, 12G, 12B-1 and 12B-2 generate power by absorbing sunlight. Power generated by the power generation panels 12R, 12G, 12B-1 and 12B-2 is supplied to the control unit 15. Dye sensitized solar cells can be used as the power generation panels 12R, 12G, 12B-1 and 12B-2.

A dye sensitized solar cell typically includes a dye sensitized porous semiconductor layer and counter electrode that are opposed to each other. The dye sensitized porous semiconductor layer is formed on a transparent conductive substrate by causing a porous semiconductor layer such as titanium oxide to carry a sensitizing dye. The counter electrode is obtained by forming, for example, a platinum layer on a substrate. The outer peripheries thereof are sealed with a sealant. An electrolyte containing redox species such as iodine or iodide ions is filled between the two electrodes.

On the other hand, among common red-based sensitizing dyes are ruthenium complex (N719) {=cis-bis(isothiocyanato)-N,N-bis(2,2'-bipyridyl-4,4'-dicarboxylato)-ruthenium(II)}, merocyanines (D149) {=5-[[4-[4-(2,2-diphenylethenyl)phenyl]-1,2,3,3a,4,8b-hexahydrocyclopent[b]indol-7-yl]-methylene]-2-(3-ethyl-4-oxo-2-thioxo-5-thiazolidinylidene)-4-oxo-Thiazolidineacetic acid}, porphyrins (TCPP) {=Tetrakis(4-carboxyphenyl)porphyrin}, xanthene-based dyes {=Rhodamine 6G} and fluorescein- or xanthene-based dyes {rose bengal}.

Further, among common green-based sensitizing dyes are squarylium-based dyes, croconium-based dyes, copper phthalocyanine {=phthalocyanines} and ruthenium complex (black dye) {tris(isothiocyanato)-ruthenium(II)-2,2':6',2"-terpyridine-4,4',4"-tricarboxylic acid}. Among common blue-based sensitizing dyes are squarylium-based dyes and cyanine-based dyes. Among common yellow-based sensitizing dyes are cyanine-based dye (D131) {=2-Cyano-3-[4-[4-(2,2-diphenylethenyl)phenyl]-1,2,3,3a,4,8b-hexahydrocyclopent[b]indol-7-yl]-2-propenoic acid}, coumarin-based dye {=coumarin 343} and stilbene-based dyes.

For example, the power generation panel 12R absorbs the wavelengths of sunlight other than red to generate power. The power generation panel 12G absorbs the wavelengths of sunlight other than green to generate power. The power generation panels 12B-1 and 12B-2 absorb the wavelengths of sunlight other than blue to generate power.

As illustrated in FIG. 1, the power generation panels 12R, 12G, 12B-1 and 12B-2 of the solar cell system 11 are arranged so that each of the four panels forms one of the four sides of a cube. Sunlight irradiated onto each side is used to generate power.

The piezoelectric elements 13-1 to 13-4 vibrate as they are supplied with power from the control unit 15. The piezoelectric element 13-1 is affixed to the power generation panel 12B-1 and vibrates the same panel 12B-1, and the piezoelectric element 13-2 is affixed to the power generation panel 12B-2 and vibrates the same panel 12B-2. Further, the piezoelectric element 13-3 is affixed to the power generation panel 12R and vibrates the same panel 12R, and the piezoelectric element 13-4 is affixed to the power generation panel 12G and vibrates the same panel 12G.

As described above, the power generation panels 12R, 12G, 12B-1 and 12B-2 serve as vibration plates thanks to the piezoelectric elements 13-1 to 13-4 affixed thereto and produce a sound as a result of the vibration of the same elements 13-1 to 13-4.

The control unit 15 operates on power supplied from the power generation panels 12R, 12G, 12B-1 and 12B-2. For example, the control unit 15 supplies power to the piezoelectric elements 13-1 to 13-4 based on the power output of each of the power generation panels 12R, 12G, 12B-1 and 12B-2, thus vibrating the same panels 12R, 12G, 12B-1 and 12B-2.

The solar cell system 11 configured as described above is used as an audio or music source adapted to output set audio or music according to the power output of each of the power generation panels 12R, 12G, 12B-1 and 12B-2.

A detailed description will be given below of the functions of the solar cell system 11 with reference to FIG. 2.

Figure 2:
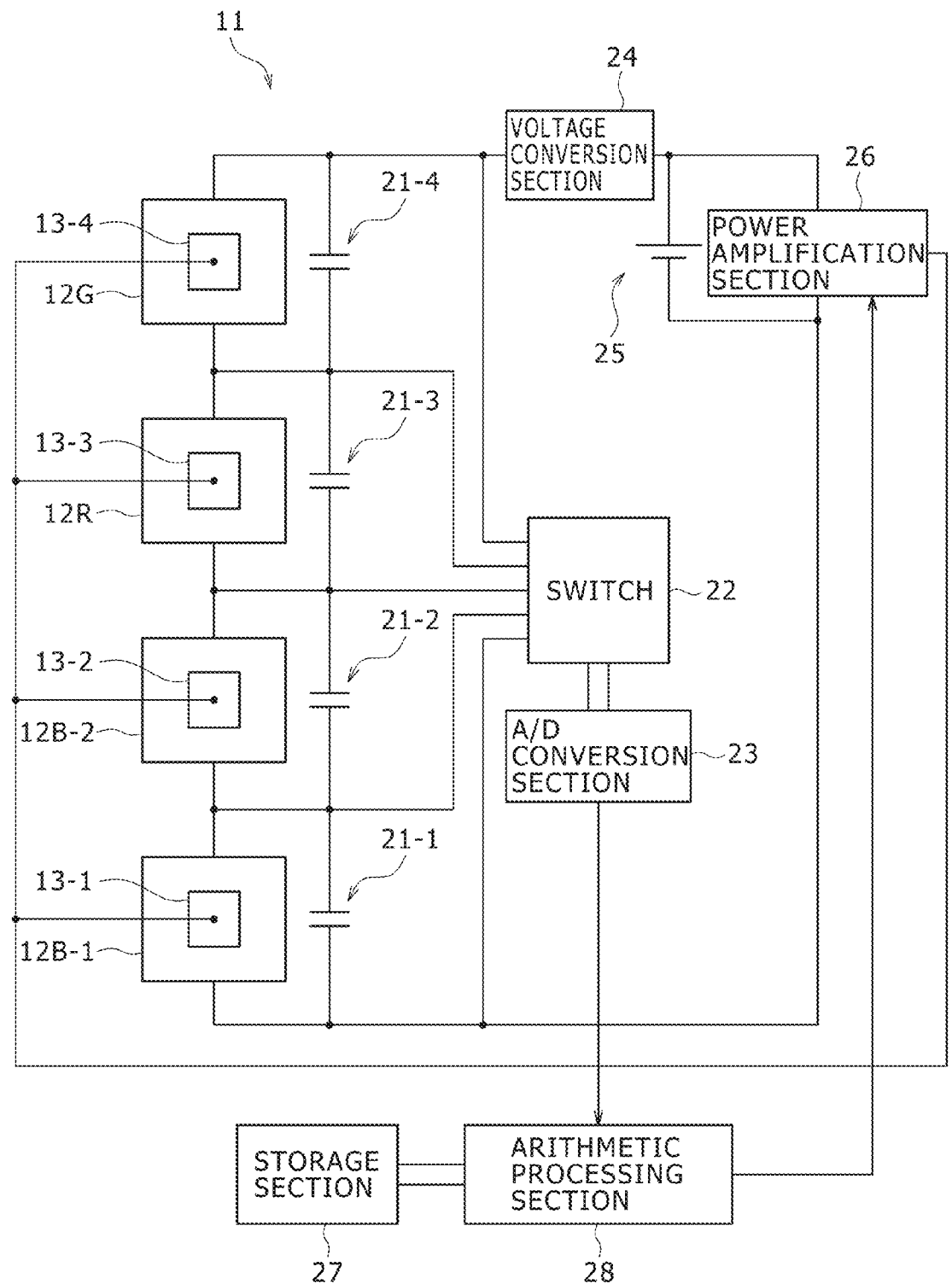
FIG. 2 is a block diagram illustrating a configuration example of the solar cell system.

The sections other than the power generation panels 12R, 12G, 12B-1 and 12B-2 and piezoelectric elements 13-1 to 13-4 illustrated in FIG. 2 are housed in the control unit 15 (FIG. 1B). That is, the solar cell system 11 includes four capacitors 21-1 to 21-4, switch 22, A/D (Analog/Digital) conversion section 23, voltage conversion section 24, secondary cell 25, power amplification section 26, storage section 27 and arithmetic processing section 28.

The capacitors 21-1 to 21-4 are connected respectively between the terminals of the power generation panels 12R, 12G, 12B-1 and 12B-2. That is, the capacitor 21-1 is connected between the terminals of the power generation panel 12B-1, and the capacitor 21-2 is connected between the terminals of the power generation panel 12B-2. Further, the capacitor 21-3 is connected between the terminals of the power generation panel 12R, and the capacitor 21-4 is connected between the terminals of the power generation panel 12G.

The power generation panels 12R, 12G, 12B-1 and 12B-2 are connected in series with each other. Each of the wires between the output terminals of the power generation panels 12R, 12G, 12B-1 and 12B-2 is connected to the switch 22. The switch 22 changes the connection between the wires from the power generation panels 12R, 12G, 12B-1 and 12B-2 and the A/D conversion section 23 as appropriate. The A/D conversion section 23 converts the input voltage (analog level) into a digital level.

For example, if the switch connects the output terminals of the power generation panel 12B-1 and the A/D conversion section 23, the same section 23 outputs the digital voltage level indicating the voltage of the power generated by the power generation panel 12B-1 (hereinafter referred to as the power output voltage level as appropriate). Further, if the switch 22 connects the output terminals of the power generation panel 12B-2 and the A/D conversion section 23, the same section 23 outputs the power output voltage level of the power generation panel 12B-2. Similarly, the A/D conversion section 23 outputs the power output voltage levels of the power generation panels 12R and 12G.

The voltage conversion section 24 converts the power generated by each of the power generation panels 12R, 12G, 12B-1 and 12B-2 into power at the specified voltage. For example, the voltage conversion section 24 converts the power into that at the voltage at which the power can be stored in the secondary cell 25. On the other hand, power generated by the power generation panels 12R, 12G, 12B-1 and 12B-2 is supplied to the power amplification section 26 via the voltage conversion section 24.

The secondary cell 25 is, for example, a lithium-ion storage cell and stores power generated by the power generation panels 12R, 12G, 12B-1 and 12B-2. Further, power stored in the secondary cell 25 is supplied as appropriate to the power amplification section 26.

The power amplification section 26 amplifies the signal supplied from the arithmetic processing section 28 and supplies the amplified signal to the piezoelectric elements 13-1 to 13-4, thus vibrating the same elements 13-1 to 13-4. This allows for the piezoelectric elements 13-1 to 13-4 to vibrate according to the signal supplied from the arithmetic processing section 28.

The storage section 27 is, for example, a flash memory (e.g., EEPROM (Electronically Erasable and Programmable Read Only Memory)) and stores an audio or music signal.

The arithmetic processing section 28 is driven by power supplied from the secondary cell 25, reading the audio or music signal from the storage section 27 and supplying the reproduced audio or music signal (analog signal) to the power amplification section 26. That is, the audio or music signal reproduced by the arithmetic processing section 28 is amplified by the power amplification section 26, allowing for each of the piezoelectric elements 13-1 to 13-4 to vibrate the power generation panels 12R, 12G, 12B-1 and 12B-2 according to the amplified signal. As a result, audio or music is output from the power generation panels 12R, 12G, 12B-1 and 12B-2.

On the other hand, the arithmetic processing section 28 is supplied with the power output voltage levels of the power generation panels 12R, 12G, 12B-1 and 12B-2 from the A/D conversion section 23. The arithmetic processing section 28 compares the voltage levels of the same panels 12R, 12G, 12B-1 and 12B-2 and determines, based on the comparison result, the audio or music to be reproduced.

In general, the maximum amplitude is found at different wavelengths of light for morning, noon and evening in the sunlight spectra as illustrated in FIG. 3. In FIG. 3, the horizontal axis represents the wavelength, and the vertical axis the spectral intensity. The sunlight spectrum in the morning is shown by a solid line, that in the afternoon by a dashed line, and that in the evening by a long dashed short dashed line. Comparing the maximum amplitudes at different wavelengths of sunlight, we find that the wavelength at which the amplitude is maximal in the afternoon is shorter than that at which the amplitude is maximal in the morning, and that the wavelength at which the amplitude is maximal in the morning is shorter than that at which the amplitude is maximal in the evening.

As described above, the power generation panels 12R, 12G, 12B-1 and 12B-2 absorb light at different wavelengths to generate power. Therefore, the arithmetic processing section 28 can identify the spectra of sunlight irradiated onto the solar cell system 11 in a simplified manner by comparing the power output voltage levels. The same section 28 can determine based on the identification result in which time zone, namely, morning, afternoon or evening, it is now.

Audio or music to be reproduced for each time zone is set in the arithmetic processing section 28. The same section 28 reproduces the audio or music appropriate to the time zone determined based on the identification result of the sunlight spectra according to the settings. It should be noted that these settings can be changed as desired.

As described above, the solar cell system 11 can be driven only by power generated by the power generation panels 12R, 12G, 12B-1 and 12B-2. As a result, no commercial power is used for the solar cell system 11, making it easy to install without any restrictions on installation location. Further, the power generation panels 12R, 12G, 12B-1 and 12B-2 serve as vibration plates in the solar cell system 11, making the apparatus operable to output audio or music appropriate to environmental light simpler in configuration and more compact than a system using a speaker.

For example, the solar cell system 11 can be used as an audio generator for use where there is no commercial power.

The solar cell system 11 can identify the spectra of sunlight based on the power output voltage levels of the power generation panels 12R, 12G, 12B-1 and 12B-2. Therefore, it is possible to determine in which time zone such as morning, afternoon or evening it is now without separately having a sensor adapted to detect the condition of sunlight. This allows for the solar cell system 11 to reproduce audio or music appropriate to the time zone.

On the other hand, in a solar cell system using silicon, for example, the power generation elements may not be colored. Therefore, color filters are used to identify the spectra of sunlight in the same manner as the solar cell system 11. Therefore, there is a concern that a solar cell system using silicon may lead to a decline in power generation efficiency and increased cost of the system as a result of use of color filters. In contrast, the solar cell system 11 uses dye sensitized solar cells as the power generation panels 12R, 12G, 12B-1 and 12B-2. Therefore, there is no such concern.

It should be noted that the power generation panels included in the solar cell system 11 are not limited to the four power generation panels 12R, 12G, 12B-1 and 12B-2. For example, the solar cell system 11 may include four or more power generation panels or a different combination of colors for the power generation panels.

Further, dye sensitized solar cells adapted to absorb light in the ultraviolet and infrared range, for example, may be used as the power generation panels making up the solar cell system 11. This makes it possible to detect the condition of sunlight irradiated onto the solar cell system 11 in an even more detailed manner. As a result, the weather can be determined, for example, by the arithmetic processing section 28.

For example, when both levels of ultraviolet and infrared radiation are high, it is determined that the weather is fine. When the level of infrared radiation is lower than that of ultraviolet radiation, it is determined that the weather is cloudy. When both levels of ultraviolet and infrared radiation are low, it is determined that it is twilight. The arithmetic processing section 28 reproduces audio or music based on these determinations. Further, the arithmetic processing section 28 can, for example, reproduce audio or music (e.g., switch to a different piece of music) appropriate to surrounding environmental light as when it is bright or dark in the surroundings.

Further, if the solar cell system 11 includes, for example, a communication section, the arithmetic processing section 28 can change the data (audio or music signal) stored in the storage section 27 using the communication section via a network. Similarly, the arithmetic processing section 28 can change the settings (those associated with the time zones, weather conditions and others) for audio and music to be reproduced.

It should be noted that flat plates may be vibrated to output audio or a speaker may be incorporated in the solar cell system 11 to output audio from the speaker rather than vibrating the power generation panels with the piezoelectric elements 13-1 to 13-4.

Further, the term "system" in the present specification refers to an apparatus as a whole which includes a plurality of devices.

It should be noted that the embodiment according to the present disclosure is not limited to that described above but may be modified in various manners without departing from the scope of the present disclosure.

The present disclosure contains subject matter related to that disclosed in Japanese Priority Patent Application JP 2010-144387 filed in the Japan Patent Office on Jun. 25, 2010, the entire content of which is hereby incorporated by reference.

What is claimed is:

1. A solar cell system comprising:
   a plurality of power generation panels each configured to absorb light in a range of wavelengths different from other of the plurality of power generation panels and convert light into power;
   a voltage detection section configured to detect voltages of the power generated by the plurality of power generation panels;
   a reproduction section configured to compare the detected voltages of the power generated by the plurality of power generation panels, and reproduce an audio signal based on the comparison; and
   an output section configured to output the audio signal reproduced by the reproduction section,
   wherein the output section comprises one or more piezoelectric elements that each expand or contract in response to a voltage applied thereto, and
   the one or more piezoelectric elements output the audio signal by vibrating the plurality of power generation panels.

2. The solar cell system of claim 1, wherein the reproduction section identifies a current spectra of sunlight by comparing the detected voltages of the plurality of power generation panels and reproduces an audio or music signal associated with a current time zone determined based on the identification.

3. The solar cell system of claim 1, further comprising
   a power storage section adapted to store power generated by the plurality of power generation panels.

4. A solar cell system comprising:
   a plurality of power generation panels each configured to absorb light in a range of wavelengths different from other of the plurality of power generation panels and convert light into power;
   a voltage detection section configured to detect voltages of the power generated by the plurality of power generation panels;
   a reproduction section configured to compare the detected voltages of the power generated by the plurality of power generation panels, and reproduce an audio or music signal based on the comparison; and
   an output section configured to output the audio or music signal reproduced by the reproduction section, wherein the reproduction section identifies a current spectra of sunlight by comparing the detected voltages of the power generated by the plurality of power generation panels and reproduces the audio or music signal corresponding to a current time zone based on the current spectra of sunlight.

5. The solar cell system of claim 1, wherein each of the one or more piezoelectric elements is connected to one of the plurality of power generation panels, and wherein the voltage applied to each of the one or more piezoelectric elements is based on the power generated by a corresponding one of the of the plurality of power generation panels to which each of the one or more piezoelectric elements is connected.

* * * * *